United States Patent [19]

Moore et al.

[11] Patent Number: 5,177,126
[45] Date of Patent: Jan. 5, 1993

[54] HALOPOLYMER PRIMER COMPOSITIONS CONTAINING AN OXIDE OF TITANIUM

[75] Inventors: James B. Moore, Piscataway; William A. Miller, Bridgewater, both of N.J.

[73] Assignee: Ausimont, U.S.A., Inc., Morristown, N.J.

[21] Appl. No.: 716,520

[22] Filed: Jun. 17, 1991

[51] Int. Cl.⁵ .............................................. C08K 3/22
[52] U.S. Cl. .................................. 523/458; 523/457
[58] Field of Search ................ 523/458, 457; 525/121

[56] References Cited

U.S. PATENT DOCUMENTS

| | | | |
|---|---|---|---|
| 2,904,528 | 9/1959 | Honn | 525/121 |
| 2,979,418 | 4/1961 | Dipner | 428/421 |
| 3,989,873 | 11/1976 | Robertson et al. | 526/249 |
| 4,098,756 | 7/1978 | Miller et al. | 523/458 |
| 4,179,542 | 12/1979 | Christofas et al. | 523/458 |
| 4,421,878 | 12/1983 | Close | 525/121 |
| 4,684,677 | 8/1987 | Higginbotham et al. | 523/458 |
| 5,008,135 | 4/1991 | Giordano et al. | 525/121 |

*Primary Examiner*—Veronica P. Hoke
*Attorney, Agent, or Firm*—John G. Gilfillan, III; Raymond J. Lillie

[57] ABSTRACT

A composition suitable for use as a primer coating for a substrate which comprises a halopolymer, an epoxy resin, and an oxide of titanium. The epoxy resin and oxide of titanium are present in amounts effective to provide a primer coating of the composition over a substrate. Preferred halopolymers are ethylene/chlorotrifluoroethylene copolymers and ethylene/tetrafluoroethylene copolymers. Preferred epoxy resins include bisphenol A based epoxy resins and epoxy cresol novolac resins. A preferred oxide of titanium is titanium dioxide. Such compositions are particularly useful as primer coatings for metal substrates.

12 Claims, No Drawings

HALOPOLYMER PRIMER COMPOSITIONS CONTAINING AN OXIDE OF TITANIUM

This invention relates to halopolymer compositions useful for coating substrates. More particularly, this invention relates to improved halopolymer primer compositions containing an oxide of titanium.

Although halopolymers, such as ethylene/chlorotrifluoroethylene copolymers and ethylene/tetrafluoroethylene copolymers, may be used for coating substrates, the adhesion between such polymers and the underlying substrates, particularly in the case of metal substrates, may be too weak for certain applications, especially those wherein a severe environment is encountered (e.g., steam and boiling water applications.) Thus, certain substances have been added to the polymers to form primer compositions for bonding the polymer to the substrate. For example, U.S. Pat. No. 3,989,873, issued to Robertson, et al., discloses a fluoropolymer primer comprising either an ethylene/chlorotrifluoroethylene or ethylene/tetrafluoroethylene copolymer, each of which may optionally contain up to 10 mole % of an additional monomer selected from the group consisting of 3,3,3-trifluoro 2-trifluoromethyl propene and a vinyl monomer with a side chain having at least two carbon atoms, and which is free of telogenic activity; and 1 to 40 wt.% of an oxide of cobalt, nickel, manganese, chromium, tin, molybdenum, tungsten, or mixtures thereof. U.S. Pat. No. 4,098,756, issued to Miller, et al. discloses a fluoropolymer primer composition comprising the components of U.S. Pat. No. 3,989,873, and in addition also includes an epoxy resin. U.S. Pat. No. 4,179,542, issued to Christofas, et al., discloses a primer coating which includes a halogenated (at least partly fluorinated) ethylene polymer, an epoxy resin, and a metallic pigment powder. The metallic pigment powder may be a stainless steel pigment powder, or other metallic powder such as, for example, an aluminum or copper pigment powder.

In accordance with an aspect of the present invention, there is provided a composition comprising a halopolymer, an epoxy resin, and an oxide of titanium. The epoxy resin and the oxide of titanium are present in amounts effective to provide a primer coating of the composition over a substrate.

The composition is particularly useful as a primer coating for substrates such as metals, and may be used in conjunction with an overlying layer(s) of the halopolymer. Preferred halopolymers are ethylene/chlorotrifluoroethylene copolymers and ethylene/tetrafluoroethylene copolymers. The ethylene/chlorotrifluoroethylene copolymer may contain from about 40 mole % to about 60 mole % ethylene, and about 40 mole % to about 60 mole % chlorotrifluoroethylene. The ethylene/tetrafluoroethylene copolymer may contain from about 40 mole % to about 60 mole % ethylene, and about 40 mole % to about 60 mole % tetrafluoroethylene. The halopolymer may be present in the composition in an amount of from about 45 wt. % to about 80 wt. %.

Epoxy resins which may be employed in the composition include, but are not limited to, epoxy resins which may be prepared by the condensation of epoxy compounds, such as epichlorohydrin and glycerol dichlorohydrin, with polyhydric-organic compounds such as alcohols; e.g., pentaerythritol; dihydric alcohols, e.g., glycerol; dihydric phenols, e.g., bisphenol A; and trihydric phenols. For example, bisphenol A based epoxy resins, such as epoxy resins prepared by the condensation of bisphenol A and epichlorohydrin, or the diglycidyl ether of bisphenol A, may be employed. Other epoxy resins include epoxidized novolac resins such as epoxy cresol novolacs and epoxy phenol novolacs. Other epoxy resins which may be employed include cycloaliphatic resins in which the epoxide groups are attached directly to the cycloaliphatic portions of the molecule rather than on the alkyl chain. Preferred epoxy resins include bisphenol A based epoxy resins and epoxy cresol novolac resins. A preferred bisphenol A based epoxy resin has the following structure:

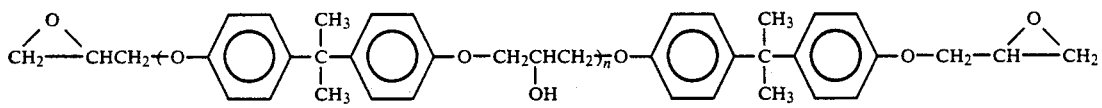

wherein n is from 2 to about 30.

A preferred epoxy cresol novolac resin has the following structure:

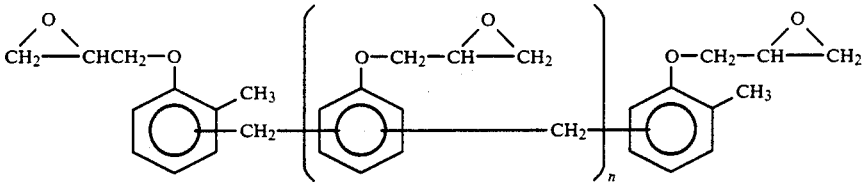

wherein n is from about 5 to about 25.

The epoxy resins may also include curing agents such as amine curing agents which permit their curing at high temperatures, pigments, colorants, and/or functional fillers, such as, for example, sulfates. Examples of amine curing agents which may be employed include, but are not limited to, polyamidoamines (such as polyamidoamines derived from dimerized linoleic acid and diethylenetriamine); amidoamines (such as amidoamines derived from stearic acid); aliphatic amine adducts; alkylene oxide/polyamine adducts; polyalkylene oxide amines; products of the amination of polypropylene glycol or polyethylene glycol; ketimines; dicyandiamide; and aromatic amines. Examples of sulfates which may be employed include, but are not limited to, barium sulfate and calcium sulfate. A particularly preferred example of an epoxy resin which may be employed is a bisphenol A based epoxy resin of the structure hereinabove described, which is sold in combination with an amine curing agent, pigments, and fillers, as a product known as Corvel 10-1002, and Corvel epoxy green product 10-6055 which are products of Morton Thiokol, Inc.

The epoxy resin may be present in the composition in an amount of from about 15 wt. % to about 50 wt. %, preferably from about 20 wt. % to about 45%.

In a preferred embodiment, the oxide of titanium is titanium dioxide, or $TiO_2$. An example of titanium dioxide powder which may be employed is sold as Zopaque RCL-6, by Glidden Pigments. The titanium dioxide may be present in the composition in an amount of from about 0.5 wt. % to about 5.0 wt. %, preferably at about 1.5 wt. %.

Applicants have found that when the composition of the present invention is employed as a primer coating for a metal substrate, the primer exhibits improved high temperature wet environment bonding strength, and such coatings remain upon the substrate for extended periods of time before blistering.

The compositions of the present invention may be prepared by any suitable technique known for preparing blended thermoplastic compositions. Preferably, the epoxy resin in a suitable solvent is blended with pellets or powder of the halopolymer in a ribbon blender, v-cone blender or like apparatus and the solvent is removed by evaporation, vacuum, or other means. Thereafter, the oxide of titanium, also preferably in powder form, is blended into the mixture on the same equipment. If necessary, the final mixture may be milled to the desired size depending upon the desired method of application. Most preferably, the resulting composition is in the form of a powder.

Any of the well-known powder coating techniques may be employed to coat the composition onto the substrate. These techniques include electrostatic deposition, fluidized bed, spraying, and similar techniques. These coating techniques provide initial adherence of a powder composition to a substrate and the substrate is thereafter subjected to a heat treatment above the melting point of the powder to fuse or coalesce ("flow out") the particles of the powder into a continuous layer. In forming the coated articles of this invention, it is preferred to employ flow out temperatures in the range of about 400° F. to 600° F., preferably about 500° F. to 540° F. for copolymers based on ethylene and chlorotrifluoroethylene, and about 450° F. to 650° F., preferably about 550° F. to 600° F. for copolymers based on ethylene and tetrafluoroethylene or mixtures with chlorotrifluoroethylene. The duration of the heating step is dependent upon a number of factors, including the temperature employed, the coating thickness, the type of substrate, etc. In general, flow out times may be from about 1 minute to about 2 hours or more. Upon exposure to the elevated temperature, the epoxy resin crosslinks to provide firm adhesion to the substrate.

After a continuous primer coating is formed over the substrate, a layer of particles of the halopolymer coating may be likewise deposited on the primer coating and then heated to flow out such particles into a continuous coating which is fused to the surface of the primer layer. Preferably, the halopolymer used in the primer and halopolymer, or outer, coatings is the same.

The various substrates capable of being coated include, but are not limited to, metal surfaces such as surfaces of steel, aluminum, iron, zinc, cadmium, magnesium, brass, bronze, Monel ®, Inconel ®; fabrics that will withstand the heating temperatures required, such as fiberglass fabrics, asbestos fabrics, metal fabrics and the like, as well as glass and any plastic surface which will withstand high temperatures without degrading. Examples of such plastic surfaces include thermosetting resins, polyurethanes, silicones, fluoroelastomers, and the like. Especially preferred substrates are those formed of brass, bronze, aluminum, stainless steel, and carbon steel.

A metal substrate may be pretreated prior to coating with the primer to obtain a roughened surface in order to achieve a stronger adherence of the primer coating to the substrate. Any suitable surface treatment can be employed for this purpose such as sand or grit blasting, etching, etc.

The coating of primer and halopolymer may be deposited upon the substrate in any desired thickness. In forming thick coatings (e.g., 1 mil or above) it may be desirable to employ a plurality of thin layers as is conventional in order to improve the uniformity and integrity of the coating.

Substrates which are coated in accordance with the present invention have coated surfaces which are continuous and pinhole-free. The coatings of primer and halopolymer may be employed as protective as well as anti-stick surfaces. Examples of articles which may be coated include wire and cable; cookware, industrial tubing, pipes, pumps and tanks and dryer rollers as well as other articles which require coatings having high strength at elevated temperatures, resistance to chemical attack, good electrical insulating properties, non-sticking surfaces, abrasion and scratch resistance and firm adherence of the coating.

Coated articles formed in accordance with the present invention preferably include the substrate, a layer of the primer of a thickness of from about 1 mil to about 6 mils, and an overlying layer of the halopolymer having a thickness of from about 2 mils to about 80 mils.

The compositions of the present invention are particularly suited for forming a primer coating over a metal substrate. In a preferred embodiment, the metal substrate is prepared according to the National Association of Corrosion Engineers (NACE) Specification No. 1, "White Metal Blast Cleaned Surface Finish," with a profile of 3 to 4 mils. If the substrate can be coated from the outside, it should be preheated. Preheating may be done at 580° F. or above, or until carbon steel turns blue or stainless steel turns brown. If the preheating is done above 580° F., the temperature of the heating oven should be lowered to 580° F. when the preheat is complete, in order to allow the temperature of the substrate to stabilize.

Once the substrate has been preheated, the composition, in powdered form, may be applied using an electrostatic powder spray gun. The composition is applied to the substrate until the metal is no longer visible. This should require about 4 horizontal and 4 vertical passes.

After the primer composition is applied, a powdered composition of halopolymer alone is applied with 6 horizontal and 6 vertical passes. It is especially preferred that the halopolymer is the same halopolymer as employed in the primer composition. After the halopolymer is applied, the primer is applied again with 5 vertical passes and 5 horizontal passes. Then, 5 vertical passes and 5 horizontal passes of the halopolymer is applied.

The coated substrate is then heated in a heating oven to 540° F. and progress is monitored. A wet look of the coating indicates that the powder has melted. The oven temperature is then lowered to 530° F. The coated substrate is then removed from the oven and coated with halopolymer powder until the substrate turns completely white and stays white. The coated substrate is the returned to the oven at 540° F., and the coated substrate is monitored as hereinabove described for melting of the powder. When the powder is melted, the temperature is lowered to 520° F., and the coated substrate is then removed. Another heavy coating of halopolymer is then applied, and the coated substrate is returned to the oven at 530° F. The coated substrate may be removed upon melting of the halopolymer powder.

If further thickness build is desired, more heavy coatings of halopolymer may be applied until desired thickness is achieved. Each subsequent time a coating of halopolymer is applied to the coated substrate, and the coated substrate is returned to the oven, the oven temperature is lowered 10° F. until the temperature reaches 500° F. A preferred coating thickness for corrosion resistance is about 40 mils.

The invention will now be described with respect to the following examples; however, the scope of the present invention is not to be limited thereby.

Example 1

Two steel panels, Panels 1 and 2, each having dimensions of 8"×8"×¼", were coated with primer composition(s) of the present invention. The primer composition had the following components:
  Equimolar ethylene/chlorotrifluoroethylene copolymer—73.5 wt. %
  Bisphenol A-based epoxy resin—25.0 wt. % (Corvel 10—1002)
  Titanium dioxide—1.5 wt. %
  (Zopaque RCL-6)

After the panels were coated with primer, the panels were coated with an equimolar ethylene/chlorotrifluoroethylene copolymer to form a coating having a total thickness of 60 mils.

After Panels 1 and 2 were coated, they were placed upon a beaker containing about 400 ml of demineralized water, which was boiling and kept at 100° C. The panels were placed upon the beaker with the coated face down, whereby the coated face was in contact with the water vapor. The panels were inspected periodically for blistering. Panel 1 remained blister-free after 63 days, while Panel 2 developed a single blister after 49 days. Comparative testing with steel panels coated with HALAR 6614 primer, followed by a coating of an equimolar ethylene/chlorotrifluoroethylene copolymer, indicated that such panels logged an average of 4 days (maximum 7 days) before such panels showed signs of blistering. The composition of HALAR 6614 primer was as follows:
  Equimolar ethylene/chlorotrifluoroethylene copolymer—72.5 wt. %
  Bisphenol A-based epoxy resin—25.0 wt. % (Corvel 10-6055)
  Cobalt oxide—2.5 wt. %

EXAMPLE 2

This example was carried out in accordance the procedure of ASTM Designation C868-85.

Panels A and B, as well as a control panel, were grit blasted with 60 grit aluminum oxide. Each of the panels is a metal substrate of unused, hot-rolled carbon steel measuring 8"×8"×¼". The control panel was first coated with HALAR 6614 primer as described in Example 1, and then coated by electrostatic coating with an equimolar ethylene/chlorotrifluoroethylene copolymer to form a coating having a thickness of 25-30 mills. Panel A was initially coated with a primer composition of the present invention as hereinabove described in Example 1. Panel A was then coated with an equimolar ethylene/chlorotrifluoroethylene copolymer to form a coating having a total thickness of 45-50 mils. Panel B was initially coated with primer composition in accordance with the present invention as hereinabove described in Example 1, followed by coating with an equimolar ethylene/chlorotrifluoroethylene copolymer. The coating of Panel B had a total thickness of 70-80 mils.

Each of the coated panels was then subjected to exposure to steam at a temperature of 104° C. (220° F.) in a steam pressure vessel containing high pressure steam in equilibrium with liquid hot water. Each panel was examined for water permeation and the formation of blisters. The control panel failed due to water permeation after 4 days and had blisters over the entire test area. Panel A failed after 27 days and had two blisters about 1 inch in diameter. Panel B failed after 98 days and had one blister about 1½" in diameter.

Advantages of the present invention include the ability of the primer to provide a more effective barrier to steam and/or boiling water than existing primer systems. In addition, the primer does not degrade the halopolymer or cause bubbles in the halopolymer at the processing temperatures that are common for the preferred halopolymers hereinabove described. The primer also retains its color at the halopolymer processing temperatures, and the ingredients of the primer are compatible with the halopolymer powder, i.e., the ingredients become fully dispersed in the halopolymer on melting in order to provide a coating that is uniform in appearance.

It is to be understood, however, that the scope of the present invention is not to be limited to the specific embodiments described above. The invention may be practiced other than as particularly described and still be within the scope of the accompanying claims.

What is claimed is:

1. A composition, comprising:
  from about 45 wt. % to about 80 wt. % of a halopolymer selected from the groups consisting of ethylene/chlorotrifluorethylene copolymers and ethylene/tetrafluoroethylene copolymers;
  from about 15 wt. % to about 50 wt. % of an epoxy resin; and
  from about 0.5 wt. % to about 5.0 wt. % of an oxide of titanium.

2. The composition of claim 1 wherein said oxide of titanium is titanium dioxide.

3. The composition of claim 1 wherein said epoxy resin is present in an amount of from about 20 wt. % to about 45 wt. %.

4. The composition of claim 1 wherein said halopolymer is an ethylene/chlorotrifluoroethylene copolymer.

5. The composition of claim 1 wherein said epoxy resin is selected from the group consisting of cresol novolac epoxy resins and bisphenol-A based epoxy resins.

6. The composition of claim 5 wherein said epoxy resin is bisphenol-A based epoxy resin.

7. The composition of claim 6 wherein said bisphenol-A based epoxy resin is of the formula:

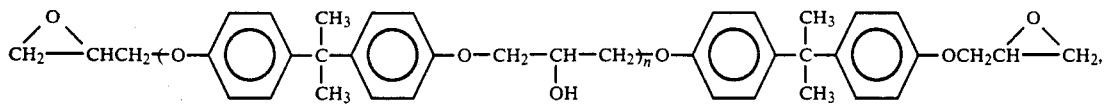

wherein n is from 2 to about 30.

8. The composition to claim 5 wherein said epoxy resin is cresol novolac epoxy resin.

9. The composition of claim 8 wherein said cresol novolac epoxy resin has the formula:

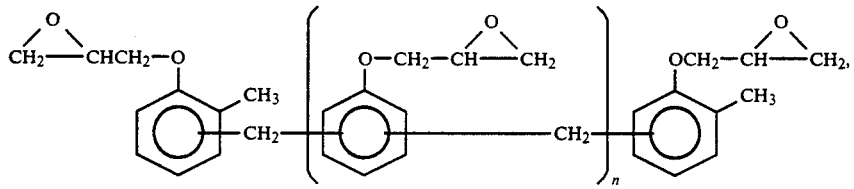

wherein n is from about 5 to about 25.

10. The composition of claim 1 wherein said oxide of titanium is present in an amount of about 1.5 wt. %.

11. The composition of claim 1, and further comprising a sulfate.

12. The composition of claim 11 wherein said sulfate is selected from the class consisting of barium sulfate and calcium sulfate.

* * * * *